Patented Oct. 20, 1925.

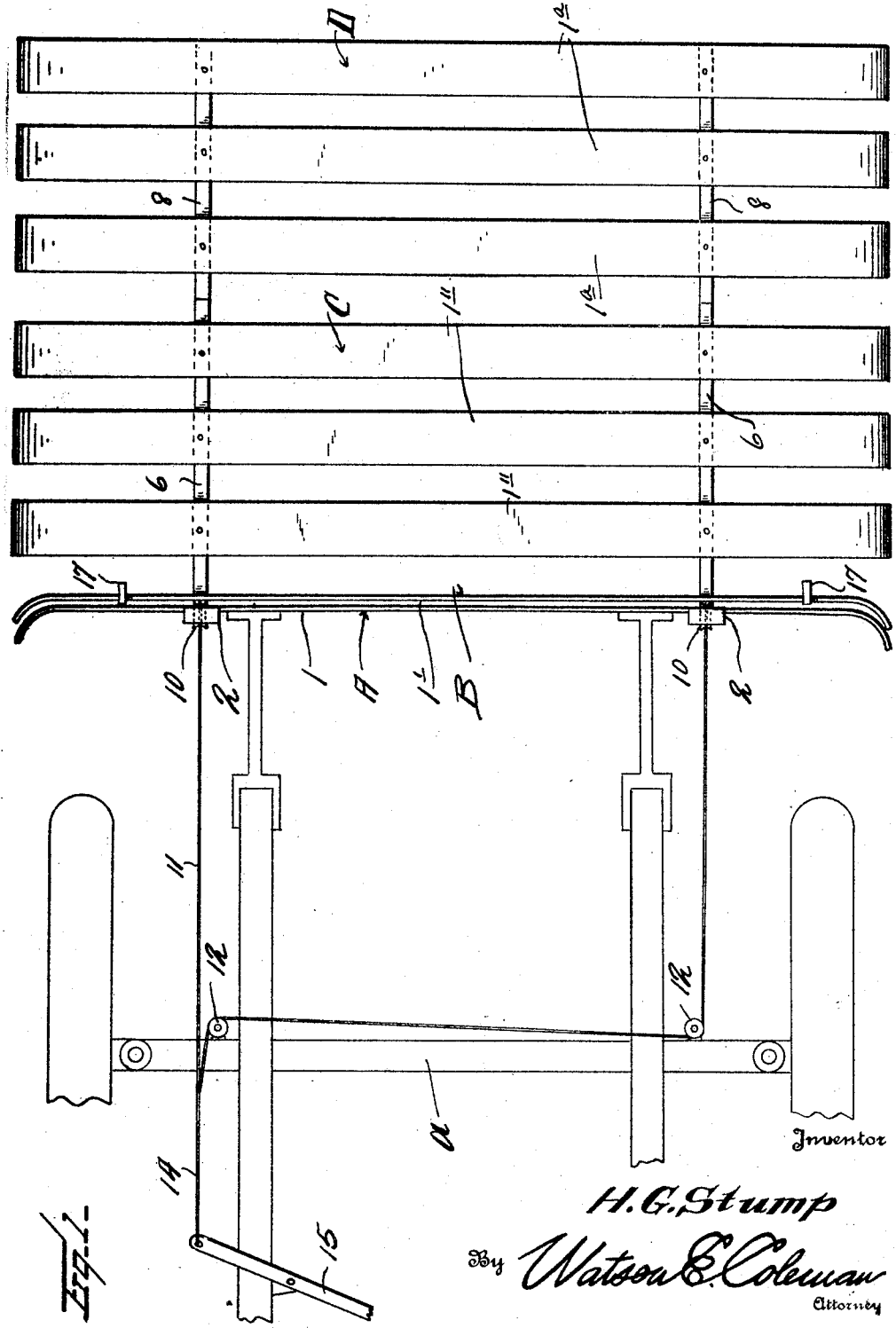

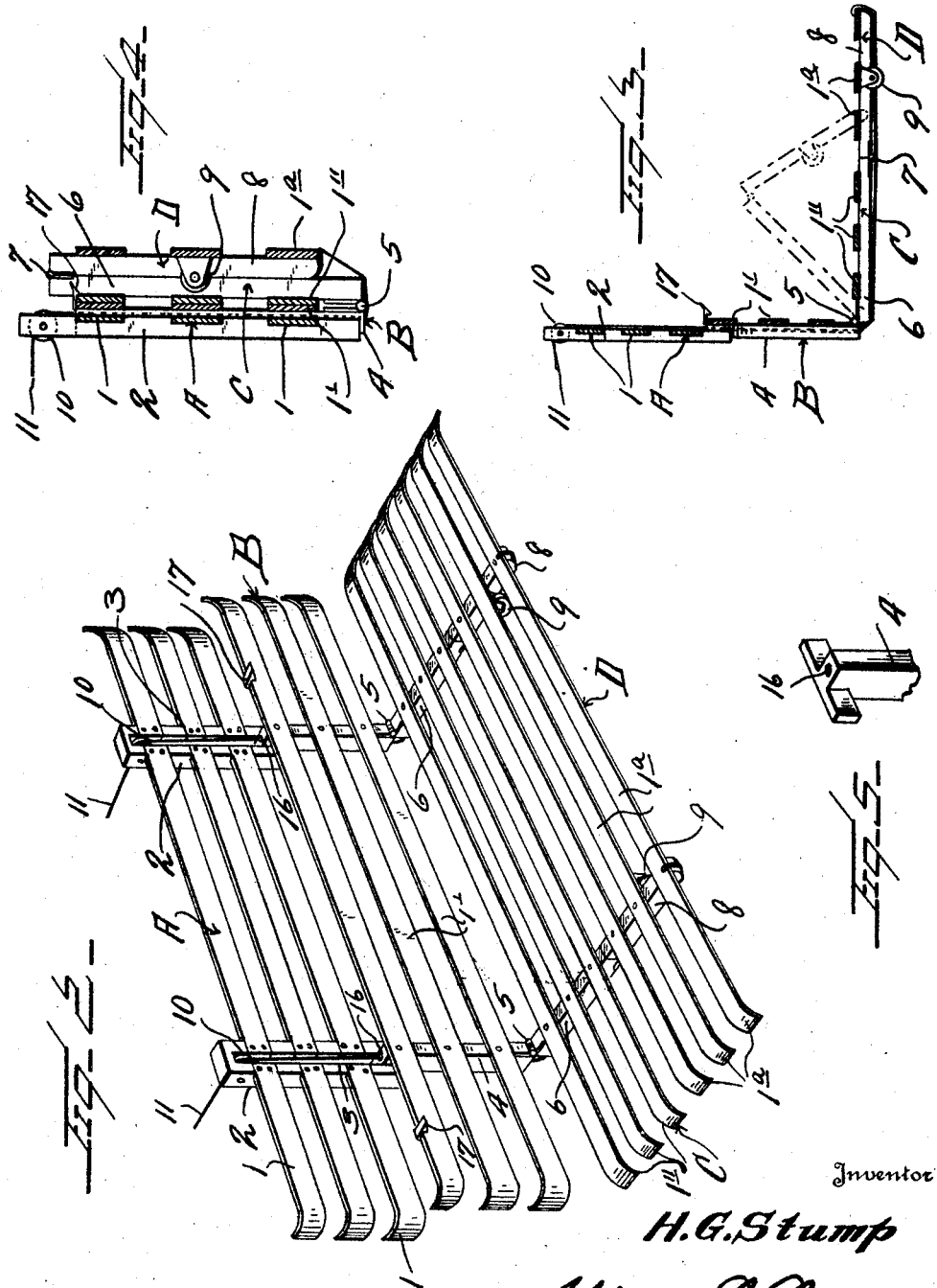

1,558,411

UNITED STATES PATENT OFFICE.

HOMER G. STUMP, OF CADILLAC, MICHIGAN.

BUMPER.

Application filed June 30, 1925. Serial No. 40,579.

*To all whom it may concern:*

Be it known that I, HOMER G. STUMP, a citizen of the United States, residing at Cadillac, in the county of Wexford and State of Michigan, have invented certain new and useful Improvements in Bumpers, of which the following is a specification, reference being had to the accompanying drawings.

This invention relates to certain improvements in bumpers and it is an object of the invention to provide a device of this general character constructed in a manner whereby it may be readily employed at will as a fender.

Another object of the invention is to provide a device of this general character comprising a plurality of hingedly connected sections or units one of which having sliding connection with another member or unit attached to the vehicle together with means for maintaining the various sections or units in folded or compacted relation.

The invention consists in the details of construction and in the combination and arrangement of the several parts of my improved bumper whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan illustrating a bumper constructed in accordance with an embodiment of my invention and in applied position, the lifting means therefor and the parts associated therewith being of a diagrammatic character;

Figure 2 is a view in perspective of my improved bumper in extended or working position;

Figure 3 is a vertical sectional view taken through the device as illustrated in Figure 1, a second position of certain of the parts being indicated by broken lines;

Figure 4 is a vertical sectional view taken through the bumper when in folded or compacted assembly;

Figure 5 is a fragmentary view in perspective of one of the cross members herein employed.

As disclosed in the accompanying drawings, A denotes a section or unit of my improved device which is adapted to be held in any desired manner forwardly of the body of a vehicle and having its end portions extending beyond the adjacent wheels. The section or unit A comprises the elongated parallel members 1 which are connected adjacent their opposite ends by the forwardly disposed blocks 2 provided with the vertical guide slots 3.

The section B is somewhat similar to the section A except that the parallel members 1' thereof are connected by the rearwardly disposed members or tracks 4 having sliding engagement within the guide slots 3 of the section A hereinbefore referred to.

Pivotally connected, as at 5, but preferably by spring hinges, are the cross members 6 connecting the parallel members 1" of the section or unit C. The opposite end portions of the members 6 are also pivotally connected, as at 7, preferably by spring hinges, to the cross members 8 connecting the parallel members 1$^a$ comprised in the section or unit D.

When the sections A, B, C, and D are in folded or compacted relation, the device serves to advantage as a bumper, but when said sections are unfolded and in extended relation they serve as a fender and particularly when the car is traveling through heavy traffic.

The opposite end portions of the section B carry the rollers or wheels 9 which are adapted to travel upon the road surface when the device is extended for use as a fender, said rollers or wheels 9 maintaining the lower or outermost section D out of direct contact with such surface.

The upper portions of the blocks 2 carry the pulleys 10 over which are directed the flexible members or cables 11 which extend around the guide pulleys 12 suitably mounted on the front axle *a* of the car and constitute branches of the single or common operating member or cable 14. This cable or operating member 14 leads to and is suitably attached to an operating lever 15 at any desired location on the car and which may be of a type to be operated either by hand or foot as preferred. The outer portions of each of the flexible members or cables 11 extend through an opening 16 in a member or track 4 and then under the sections or units C and D and secured to the section or unit D.

When pull is imposed upon the single or common operating member or cable 14 and the branch flexible members or cables 11, the section or unit D will fold under the section or unit C and the two such folded sections or units C and D will swing back against the unit or section B whereupon the sections B, C and D will then move upwardly of the section or unit A until all of such sections or units are in overlying relation. When in this folded or compacted arrangement, the spring catches 17 adjacent to the opposite ends of the section B and at the upper portion thereof engage the section C to hold it tightly in its folded or compacted position whereby the liability of rattling of the sections or units is substantially eliminated.

The relative folding of the sections B, C and D is materially facilitated by the spring hinges 5 and 7 yet said hinges offer no undue hindrance to the requisite extended adjustment of the device when it is desired to employ the same as a fender.

When the device is used as a fender it is to be understood that the sections A and B are substantially vertically disposed while the sections C and D are disposed forwardly substantially in a horizontal position.

From the foregoing description it is thought to be obvious that a bumper constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A combination bumper and fender for a vehicle comprising a unit adapted to be supported by the vehicle and disposed in a vertical direction, a second unit slidably connected with the first named unit for movement in a vertical direction, a plurality of hingedly connected units adapted to fold one upon the other, one of said last named units being hingedly connected to the second unit, and means for holding said hingedly connected units in folded relation and to maintain the second unit in its uppermost position.

2. A combination bumper and fender for a vehicle comprising a unit adapted to be supported by the vehicle and disposed in a vertical direction, a second unit slidably connected with the first named unit for movement in a vertical direction, a plurality of hingedly connected units adapted to fold one upon the other, one of said last named units being hingedly connected to the second unit, and means for holding said hingedly connected units in folded relation and to maintain the second unit in its uppermost position, said means also operating to impart the requisite folding movement to the hingedly connected units and upward movement to the second unit.

3. A combination bumper and fender for a vehicle comprising a unit adapted to be supported by the vehicle and disposed in a vertical direction, a second unit slidably connected with the first named unit for movement in a vertical direction, a plurality of hingedly connected units adapted to fold one upon the other, one of said last named units being hingedly connected to the second unit, means for holding said hingedly connected units in folded relation and to maintain the second unit in its uppermost position, and means carried by one of the hingedly connected units and engaging a second of such units for holding the same in folded relation.

In testimony whereof I hereunto affix my signature.

HOMER G. STUMP.